Patented Sept. 24, 1946

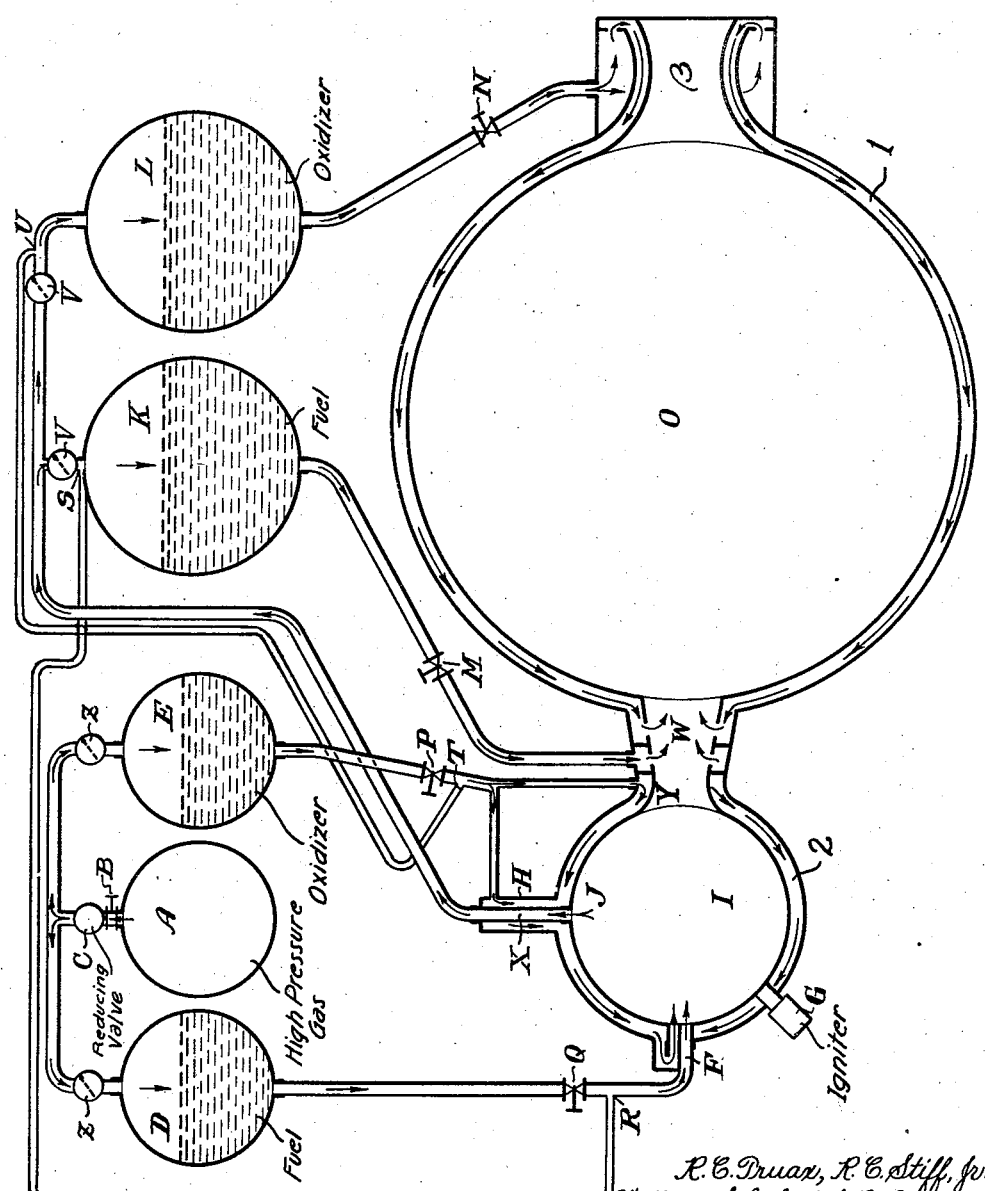

2,408,111

UNITED STATES PATENT OFFICE 2,408,111

TWO-STAGE ROCKET SYSTEM

Robert C. Truax, Ray C. Stiff, Jr., William Schubert, and James R. Patton, Jr., United States Navy, and Robertson Youngquist, Annapolis, Md.

Application August 30, 1943, Serial No. 500,584

3 Claims. (Cl. 60—35.6)

(Granted under the act of March 3, 1883, as amended April 30, 1928; 370 O. G. 757)

The subject of this invention is a novel type of propulsion jet or rocket engine.

It has been customary in rocket type engines to supply the propellent fluid, such as gasoline or nitric acid, under pressure to the engine. The streams of the propellent in the engine chamber after injection were ignited by some heat source such as a common powder squib, electric spark, electric heating coil, etc. With combustion established the products of combustion built up the pressure in the engine chamber and were discharged steadily through a nozzle to produce the thrust. The nozzle and combustion chamber were usually jacketed and cooled by a liquid medium in order to provide smoother operation and longer life.

A major purpose in the operation of these engines was the problem of supplying gas under pressure to the propellent fluids to furnish the necessary supply pressure thereof to the engine nozzle. Such gas supply, as for example nitrogen, necessitated the use of high-pressure storage bottles of considerable weight. It was therefore desirable to provide some means of supplying a gas under pressure directly from the engine to provide the necessary propellent supply pressure. It was also found desirable to provide a reliable source of adequate heat for starting the combustion. A further desirable feature was the provision of some adequate means of thoroughly atomizing and mixing the propellent fluids as they were injected into the combustion chamber for thorough and efficient combustion.

The object of this invention is to provide such means in a rocket-type engine for thoroughly atomizing and mixing the propellent fluids for assuring ignition thereof at the beginning of, as well as during, operation, and at the same time furnishing a gas under sufficient pressure to the propellent supply tanks to force the propellent fluids into the nozzle of the combustion chamber. A further object is to provide adequate means for cooling the combustion chamber while simultaneously heating one or both propellent fluids, which may serve as the cooling medium, prior to their injection through the engine nozzle. These and other more specific objects will become apparent as the description of the present invention proceeds, having reference to the accompanying drawing, in which the single figure shows a diagrammatic illustration of the preferred arrangement and relation between the various elements of the invention.

In the form illustrated the engine includes a high pressure gas supply tank A from which the gas is supplied through the shut-off valve B and a pressure reducing valve C to the two auxiliary tanks D and E through check valves Z. One of these auxiliary tanks may contain a hydrocarbon liquid fuel and the other a liquid form of oxidizer. The main fuel and oxidizer tanks K and L respectively supply the propellent fluids through the shut-off valves M and N to the main combustion chamber O of the engine A through the nozzle W. One of these propellents fed through the shut-off valve N is shown passing around the engine power jet nozzle β and through a jacket I around the combustion chamber before it enters the nozzle W. The means for atomizing and mixing the propellents, as they enter the nozzle W, is the stream of products of combustion furnished by the preliminary combustion chamber I, which is similar to the main combustion chamber except that it is much smaller and is supplied by the propellent liquids from the auxiliary tanks through the nozzle F. The fuel fed to this nozzle passes through the cut-off valve Q, whereas the oxidizer is passed through the cut-off valve P, whence its path is divided, part of it being fed to the nozzle of the main combustion chamber at the point Y and then through a cooling jacket 2 around the preliminary combustion chamber to the nozzle F while the other portion is fed through a cooling jacket H around an exhaust outlet X from the preliminary combustion chamber and then into the cooling jacket of the preliminary combustion chamber. The exhaust outlet X delivers part of the products of combustion from the preliminary combustion chamber to the upper portions of the main tanks K and L through their respective check valves V. Conduit connections are provided between the auxiliary supply lines below the shut-off valves Q and P at the points R and T respectively to the exhaust connections to the main tanks K and L at the points S and U, respectively, for the purpose of rendering the gases ducted to these tanks inert by injecting or bleeding an excess of oxidizer into the duct leading to the oxidizer tank and an excess of fuel into the duct leading to the fuel tank. This injection should take place before the gases are cooled below reaction temperature. Suitable ignition means is provided in the preliminary combustion chamber at G. The operation of this engine is as follows:

To begin with, the shut-off valve B is opened, permitting the pressure in the auxiliary tanks D and E to build up to the required pressure in accordance with the adjustment of a pressure reducing valve C. At the same time, the necessary pressure is supplied to the ignition means G, or, if the ignition means are of some other form, they are respectively turned on at this time. The valves Q and P are next opened, whereupon the propellent fluids are supplied through the jet F and ignited within the preliminary combustion chamber. The products of combustion in this chamber are then forced out through the nozzle W into the main combustion chamber, and then out through the propulsion nozzle β. Part of the combustion gases from the preliminary combustion chamber is delivered through the exhaust conduit X and the check valves V to the main tanks K and L, being mixed prior to their entry into the tanks K and L with an excess of the other propellent fluid through the connections at S and U, respectively. The object of these connections is to furnish a sufficient amount of the corresponding propellent fluid in gaseous form to combine with any excess of gases in the exhaust gas of the fluid in the other tank, so as to obviate the presence of any gases in either tank of the fluids of the other tank, which might constitute a hazard, particularly if the two propellent fluids are of the type which combine readily at such lower temperatures as might occur in these tanks. When the pressures in the tanks K and L are sufficiently built up, the shut-off valves M and N are opened. The tank K in the present form contains a hydrocarbon fuel which may be the same as that contained in the auxiliary tank D and the tank L has an oxidizer fluid which may be the same as that contained in auxiliary tank E. The hydrocarbon fuel is fed directly through the shut-off valve M to the nozzle W of the main combustion chamber, whereas the oxidizer is fed to this nozzle W by way of the cooling jacket after first passing around the propulsion nozzle β. As the propellents are injected through the nozzle W, the gases of combustion from the preliminary combustion chamber which are forced through this nozzle W, provide thorough atomization and mixing as well as continuous ignition to the propellents from the main tanks. This provides a complete and efficient combustion of the gases within the main combustion chamber, which supplies the propulsion jet β with the necessary power fluid.

The form of engine shown in the drawing indicates the use of spherical combustion chambers. This shape of the combustion chambers is not essential to the proper operation of the present invention, and any other suitable forms of chambers might be used. The preliminary combustion chamber may be very small and of a different form from that of the main combustion chamber. Various other modifications in form and arrangement may be made in the engine without department from the scope of this invention as defined by the appended claims.

The invention described herein may be manufactured and used by or for the Government of the United States of America for governmental purposes without the payment of any royalties thereon or therefor.

What we claim is:

1. A rocket-type internal combustion engine having a main combustion chamber with a propulsion power nozzle, a supply nozzle therefor, means for supplying combustible fluids thereto, a preliminary combustion chamber for supplying gases of combustion to said supply nozzle for atomizing, mixing and igniting the combustible fluids, a supply nozzle to said preliminary combustion chamber, cooling jackets around said main and preliminary combustion chambers and said propulsion and supply nozzles, through which one of the combustible components for each combustion chamber are passed through the respective cooling jackets for preheating and conditioning said component for more intimate mixture in the respective supply nozzles with its complementary component, main supply tanks for the combustible components for the main combustion chamber, auxiliary supply tanks for the auxiliary combustion chamber, gas pressure tank for supplying pressure to said auxiliary supply tanks, and connections between the auxiliary combustion-chamber and the main supply tanks for furnishing a portion of the exhaust gases from said chamber to said tanks.

2. A rocket-type internal combustion engine having a main combustion chamber with a propulsion power nozzle, a supply nozzle therefor, means for supplying combustible fluids thereto, a preliminary combustion chamber for supplying gases of combustion to said supply nozzle for atomizing, mixing and igniting the combustible fluids, a supply nozzle to said preliminary combustion chamber, cooling jackets around said main and preliminary combustion chambers and said propulsion and supply nozzles, through which one of the combustible components for each combustion chamber are passed through the responsive cooling jackets for preheating and conditioning said component for more intimate mixture in the respective supply nozzles with its complementary component, main supply tanks for the combustible components for the main combustion chamber, auxiliary supply tanks for the auxiliary combustion chamber, gas pressure tank for supplying pressure to said auxiliary supply tanks, connections between the auxiliary combustion-chamber and the main supply tanks for furnishing a portion of the exhaust gases from said chamber to said tanks, and means for combining any possible excess of gas in the exhaust supplied to either of the main tanks of the combustible component of the fluid in the other main tank with a sufficient amount of gas of its complementary combustible, to avoid the hazard of having an explosion in either main tank by the presence of any gas of the fluid of the other tank therein, while benefitting by the additional pressure furnished by such combination of gases.

3. A rocket-type internal combustion engine having a main combustion chamber with a propulsion power nozzle, a supply nozzle therefor, means for supplying combustible fluids thereto, a preliminary combustion chamber for supplying gases of combustion to said supply nozzle for atomizing, mixing and igniting the combustible fluids, a supply nozzle to said preliminary combustion chamber, cooling jackets around said main and preliminary combustion chambers and said propulsion and supply nozzles, through which one of the combustible components for each combustion chamber are passed through the respective cooling jackets for preheating and conditioning said component for more intimate mixture in the respective supply nozzles with its complementary component, main supply tanks for the combustible components for the main combustion chamber, auxiliary supply tanks for the auxiliary combustion chamber, gas pressure tank for supplying pressure to said auxiliary supply tanks, connections between the auxiliary combustion-chamber and the main supply tanks for furnishing a portion of the exhaust gases from said chamber to said tanks, means for combining any possible excess of gas in the exhaust supplied to either of the main tanks of the combustible component of the fluid in the other main tank with a sufficient amount of gas of its complementary combustible, to avoid the hazard of having an explosion in either main tank by the presence of any gas of the fluid of the other tank therein, while benefitting by the additional pressure furnished by such combination of gases, and check valves in said connections to prevent reverse flow to the auxiliary combustion chamber.

R. C. TRUAX.
R. C. STIFF, Jr.
WILLIAM SCHUBERT.
J. R. PATTON, Jr.
ROBERTSON YOUNGQUIST.